(12) United States Patent
Zatorski et al.

(10) Patent No.: US 10,465,538 B2
(45) Date of Patent: Nov. 5, 2019

(54) GAS TURBINE ENGINE WITH REVERSIBLE FAN

(71) Applicant: General Electric Company, Schenectady, NY (US)

(72) Inventors: Darek Tomasz Zatorski, Fort Wright, KY (US); Patrick John Lonneman, Erlanger, KY (US); Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 856 days.

(21) Appl. No.: 14/873,324

(22) Filed: Oct. 2, 2015

(65) Prior Publication Data

US 2016/0146113 A1 May 26, 2016

Related U.S. Application Data

(60) Provisional application No. 62/083,137, filed on Nov. 21, 2014.

(51) Int. Cl.
*F02K 1/66* (2006.01)
*F01D 7/00* (2006.01)
(Continued)

(52) U.S. Cl.
CPC .............. *F01D 7/00* (2013.01); *F01D 25/06* (2013.01); *F02K 1/12* (2013.01); *F02K 1/30* (2013.01);
(Continued)

(58) Field of Classification Search
CPC ... F01D 7/00; F01D 25/06; F02K 1/70; F02K 1/66; F02K 1/30; F02K 1/12; F02K 1/32
See application file for complete search history.

(56) References Cited

U.S. PATENT DOCUMENTS 2,634,578 A 4/1953 Kallal
2,726,509 A 12/1955 Gist et al.
(Continued)

FOREIGN PATENT DOCUMENTS

DE 24 46 548 A1 4/1975
GB 1365491 A 9/1974
(Continued)

OTHER PUBLICATIONS

Unofficial English Translation of Chinese Office Action issued in connection with related CN Application No. 201511036161.7 dated Jan. 23, 2017.
(Continued)

*Primary Examiner* — Ted Kim
(74) *Attorney, Agent, or Firm* — General Electric; James Reed (57) ABSTRACT

A gas turbine engine having a forward thrust mode and a reverse thrust mode is provided. The gas turbine engine includes a variable pitch fan configured for generating forward thrust in the forward thrust mode of the engine and reverse thrust in the reverse thrust mode of the engine. The engine also includes a fan cowl surrounding the variable pitch fan, wherein the fan cowl forms a bypass duct for airflow generated by the fan. The fan cowl includes an aft edge that defines a physical flow area of the bypass duct, and a deflection device configured for deflecting airflow near the aft edge, wherein the deflection device is configured for operation in the reverse thrust mode of the engine. The physical flow area of the bypass duct at the aft edge remains the same in the forward thrust mode of the engine and in the reverse thrust mode of the engine.

13 Claims, 10 Drawing Sheets

(51) Int. Cl.
*F01D 25/06* (2006.01)
*F02K 1/12* (2006.01)
*F02K 1/30* (2006.01)
*F02K 1/32* (2006.01)
*F02K 1/70* (2006.01)

(52) U.S. Cl.
CPC .............. *F02K 1/32* (2013.01); *F02K 1/66* (2013.01); *F02K 1/70* (2013.01); *Y02T 50/673* (2013.01)

(56) References Cited

U.S. PATENT DOCUMENTS

| | | | |
|---|---|---|---|
| 2,927,424 A | 3/1960 | Hyde | |
| 3,007,304 A | 11/1961 | Wotton et al. | |
| 3,019,600 A * | 2/1962 | Peek, Jr. | F02C 7/042 |
| | | | 239/265.29 |
| 3,386,247 A | 6/1968 | Gross et al. | |
| 3,729,934 A | 5/1973 | Denning et al. | |
| 3,747,341 A * | 7/1973 | Davis | F02K 1/66 |
| | | | 239/265.31 |
| 3,815,357 A | 6/1974 | Brennan | |
| 3,915,415 A | 10/1975 | Pazmany | |
| 3,936,226 A | 2/1976 | Harner et al. | |
| 3,988,889 A | 11/1976 | Chamay et al. | |
| 4,177,639 A | 12/1979 | Taylor | |
| 4,340,178 A | 7/1982 | Lawson | |
| 4,371,132 A | 2/1983 | Woodward | |
| 4,807,434 A | 2/1989 | Jurich | |
| 4,922,712 A | 5/1990 | Matta et al. | |
| 4,930,307 A | 6/1990 | Newton | |
| 5,090,196 A | 2/1992 | Balzer | |
| 5,343,696 A | 9/1994 | Rohra et al. | |
| 5,568,724 A | 10/1996 | Lindner et al. | |
| 5,974,783 A | 11/1999 | Gonidec et al. | |
| 6,170,254 B1 | 1/2001 | Cariola | |
| 8,353,164 B2 * | 1/2013 | Morford | F02K 1/06 |
| | | | 137/15.1 |
| 2003/0159429 A1 | 8/2003 | Langston et al. | |
| 2009/0111370 A1 | 4/2009 | Porte et al. | |
| 2009/0288386 A1 | 11/2009 | Marshall et al. | |
| 2010/0044503 A1 | 2/2010 | Bulin et al. | |
| 2010/0072324 A1 | 3/2010 | Teulou | |
| 2011/0139540 A1 * | 6/2011 | Caruel | F02K 1/383 |
| | | | 181/215 |

FOREIGN PATENT DOCUMENTS

| | | |
|---|---|---|
| GB | 1 479 148 A | 7/1977 |
| GB | 1479149 A | 7/1977 |
| GB | 1565212 A | 4/1980 |
| JP | 01300044 A | 12/1989 |
| JP | 10196456 A | 7/1998 |
| JP | 2005519213 A | 6/2005 |
| JP | 2008-38905 A | 2/2008 |
| JP | 2008524488 A | 7/2008 |
| JP | 2010505063 A | 2/2010 |

OTHER PUBLICATIONS

European Search Report and Written Opinion issued in connection with corresponding EP Application No. 15194920.3-1607 dated Apr. 18, 2016.

European Search Report and Written Opinion issued in connection with related EP Application No. 15195700.8-1607 dated Apr. 20, 2016.

U.S. Appl. No. 62/082,726, filed Nov. 21, 2014, Stuart et al.

U.S. Appl. No. 14/940,543, filed Nov. 13, 2015, Stuart et al.

Unofficial English Translation of Japanese Office Action issued in connection with Related JP Application No. 2015226190 dated Oct. 4, 2016.

Unofficial English Translation of Japanese Office Action issued in connection with Corresponding JP Application No. 2015222554 dated Nov. 8, 2016.

Second Office Action issued in connection with corresponding CN Application No. 201511036164.0 dated May 12, 2017.

Decision to Grant issued in connection with corresponding JP Application No. 2015-222554 dated Aug. 22, 2017.

Stuart, R.A., et al., Gas turbine engine and method of assesmbling the same, GE co-pending U.S. Appl. No. 62/082,726, filed Nov. 21, 2014.

* cited by examiner

GAS TURBINE ENGINE WITH REVERSIBLE FAN

CROSS-REFERENCE TO RELATED APPLICATIONS

This non-provisional application claims the benefit of priority under 35 U.S.C. § 119(e) to U.S. Provisional Patent Application No. 62/083,137, entitled "GAS TURBINE ENGINE AND METHOD OF ASSEMBLING THE SAME", filed Nov. 21, 2014, which is herein incorporated in its entirety by reference.

BACKGROUND

The field of this disclosure relates generally to a gas turbine engine and, more particularly, to a gas turbine engine having an airflow deflection device that facilitates enabling a variable pitch fan to produce reverse thrust.

Many known gas turbine engines have a ducted fan and a core arranged in flow communication with one another. The fan provides air to the core (a "core flow") and to a bypass duct surrounding the core (a "bypass flow"). The core compresses the core flow and subsequently mixes it with fuel for igniting the mixture to generate a flow of combustion gas through a turbine. The combustion gas drives the turbine, which in turn drives the fan to generate the core flow and the bypass flow.

With the bypass flow being a source of thrust for the engine, some known fans have blades for which the pitch can be varied to optimize fan performance. In that regard, these fans can be configured such that the blades, at one pitch angle, generate an aftward directed bypass flow resulting in forward thrust, and, at another pitch angle, generate a forward directed bypass flow resulting in reverse thrust. However, in these known engines, the condition of the bypass flow is often less than optimal in both directions. As such, for gas turbine engines having variable pitch fans, it would be useful to improve the condition of the bypass flow.

BRIEF DESCRIPTION OF THE INVENTION

In one aspect, a gas turbine engine having a forward thrust mode and a reverse thrust mode is provided. The gas turbine engine includes a variable pitch fan configured for generating forward thrust in the forward thrust mode of the engine and reverse thrust in the reverse thrust mode of the engine. The engine also includes a fan cowl surrounding the variable pitch fan, wherein the fan cowl forms a bypass duct for airflow generated by the fan. The fan cowl has an aft edge that defines a physical flow area of the bypass duct, and a deflection device configured for deflecting airflow near the aft edge, wherein the deflection device is configured for operation in the reverse thrust mode of the engine. The physical flow area of the bypass duct at the aft edge remains the same in the forward thrust mode of the engine and in the reverse thrust mode of the engine.

In another aspect, a method of assembling a gas turbine engine having a forward thrust mode and a reverse thrust mode is provided. The method includes providing a core and providing a variable pitch fan in flow communication with the core. The fan is configured for generating forward thrust in the forward thrust mode of the engine and reverse thrust in the reverse thrust mode of the engine. The method also includes surrounding the core with a core cowl, and surrounding the fan with a fan cowl. The fan cowl has an aft edge that defines a physical flow area of a bypass duct formed by the fan cowl. The method further includes coupling a deflection device to at least one of the core cowl and the fan cowl. The deflection device is configured for deflecting airflow near the aft edge in the reverse thrust mode of the engine such that the physical flow area of the bypass duct at the aft edge remains the same in the forward thrust mode of the engine and in the reverse thrust mode of the engine.

In another aspect, a gas turbine engine having a forward thrust mode and a reverse thrust mode is provided. The gas turbine engine includes a variable pitch fan configured for generating forward thrust in the forward thrust mode of the engine and reverse thrust in the reverse thrust mode of the engine. The engine also includes a fan cowl surrounding the variable pitch fan, wherein the fan cowl forms a bypass duct for airflow generated by the fan. The fan cowl has an aft edge and a spoiler configured for deflecting airflow near the aft edge. The spoiler is configured for being stowed in the forward thrust mode of the engine and for being deployed in the reverse thrust mode of the engine, wherein the spoiler is a strictly external mechanism of the fan cowl.

DETAILED DESCRIPTION OF THE INVENTION

The following detailed description sets forth an airflow deflection device for a gas turbine engine and a method of assembling the same by way of example and not by way of limitation. The description should clearly enable one of ordinary skill in the art to make and use the device, and the description sets forth several embodiments, adaptations, variations, alternatives, and uses of the device, including what is presently believed to be the best mode thereof. The device is described herein as being applied to a preferred embodiment, namely a thrust reversing system for a gas turbine engine. However, it is contemplated that the device and the methods of assembling the device may have general application in a broad range of systems and/or a variety of commercial, industrial, and/or consumer applications other than thrust reversing systems for gas turbine engines.

Figure 1:
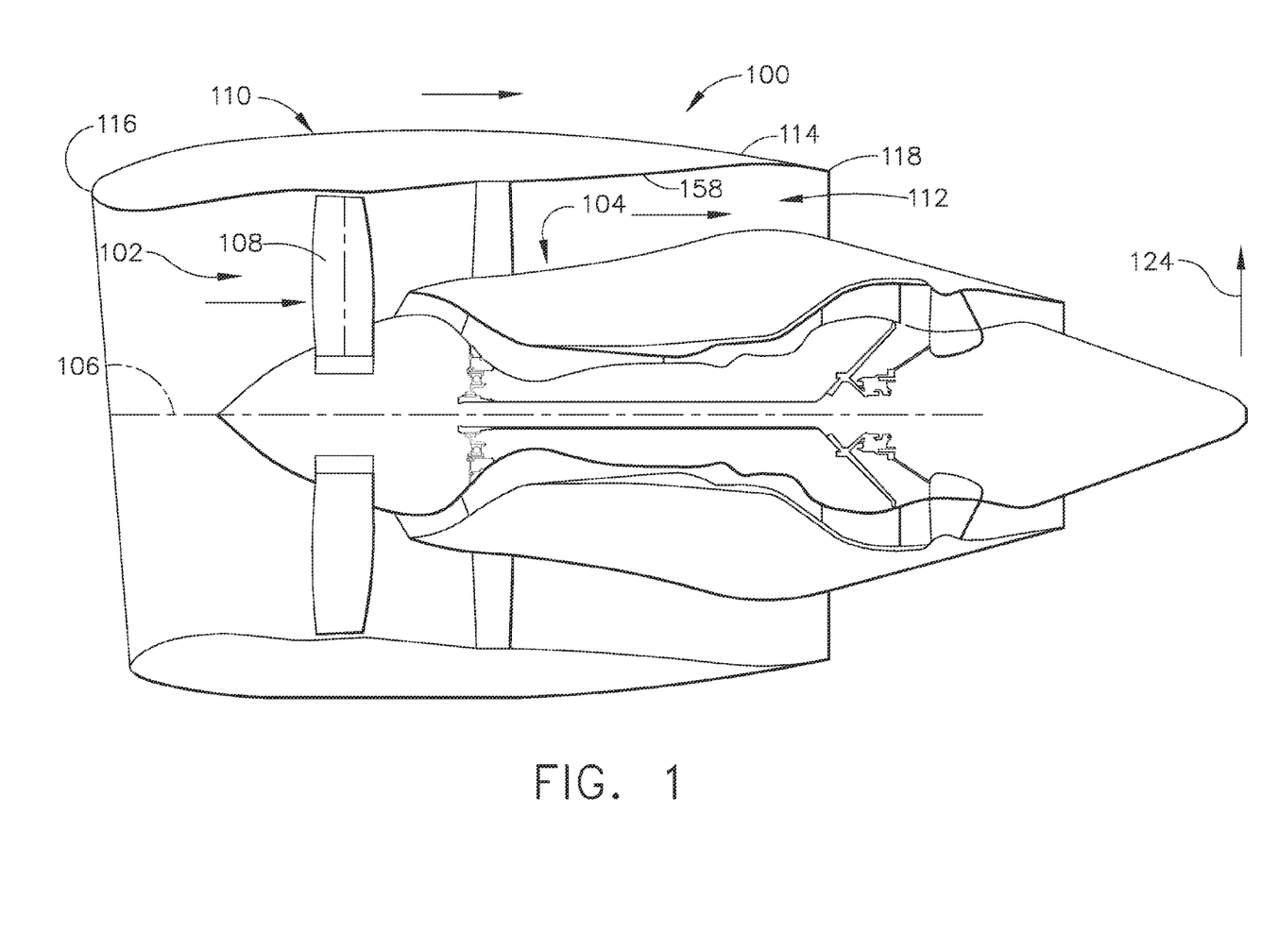
FIG. 1 is a schematic representation of a gas turbine engine operating in forward thrust mode.
Figure 2:
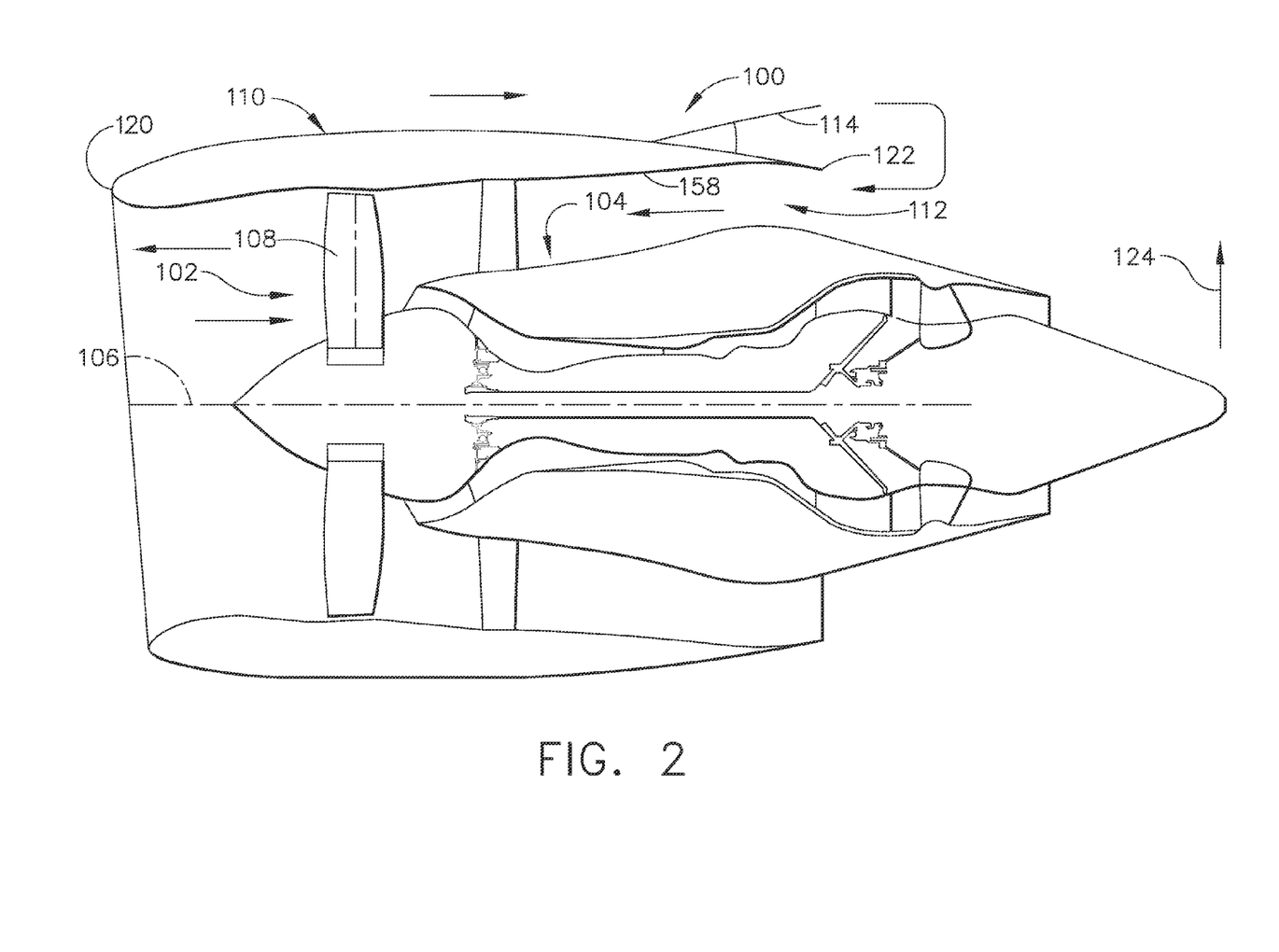
FIG. 2 is a schematic representation of the gas turbine engine shown in FIG. 1 operating in reverse thrust mode.

FIGS. 1 and 2 are schematic illustrations of a gas turbine engine 100 having a fan 102 and a core 104 arranged in flow communication with one another along a centerline axis 106 of engine 100. Fan 102 provides air to core 104 which, in turn, generates combustion gas that powers a turbine that drives fan 102 to produce thrust for engine 100. Fan 102 is a variable pitch fan, meaning that the pitch of its blades 108 can be selectively varied to generate forward thrust or reverse thrust for engine 100. A fan cowl 110 surrounds fan 102 to define a bypass duct 112 about core 104, and fan cowl 110 includes an ambient airflow deflection device (e.g., a spoiler 114).

When engine 100 is in its forward thrust mode (FIG. 1), airflow enters bypass duct 112 through a forward inlet 116 of bypass duct 112, and exits bypass duct 112 through an aft outlet 118 of bypass duct 112 (i.e., air flows through bypass duct 112 in a forward to aft direction). On the other hand, when engine 100 is in its reverse thrust mode (FIG. 2), forward inlet 116 becomes a forward outlet 120, and aft outlet 118 becomes an aft inlet 122. As such, air flows into bypass duct 112 from aft inlet 122, and air exits bypass duct 112 through forward outlet 120 (i.e., air flows through bypass duct 112 in an aft to forward direction).

As set forth in more detail below, spoiler 114 is said to be stowed in forward thrust mode of engine 100. However, in reverse thrust mode of engine 100, spoiler 114 is said to be deployed such that spoiler 114 deflects ambient airflow in a radial direction 124 to facilitate providing the ambient airflow with a wider radius about which to turn when entering bypass duct 112 through aft inlet 122, increasing the effective flow area of bypass duct 112. As such, spoiler 114 facilitates providing a greater amount of ambient airflow into bypass duct 112 in a more controlled and stabilized manner (i.e., without spoiler 114 deployed, airflow entering bypass duct 112 from aft inlet 122 tends to experience significant flow separation from fan cowl 110, and spoiler 114 facilitates minimizing such flow separation). Notably, when deployed, spoiler 114 also generates additional drag for engine 100 to facilitate decreasing the amount of reverse thrust that needs to be generated by fan 102.

Figure 3:
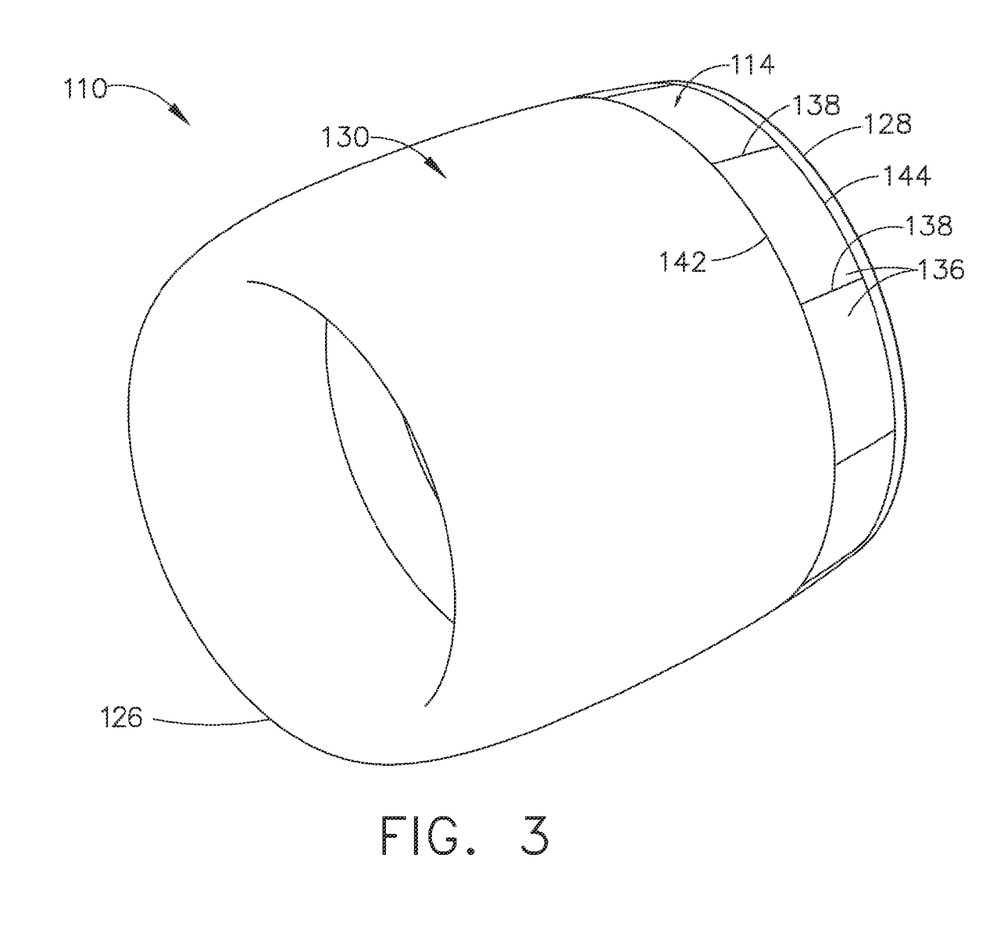
FIG. 3 is a perspective view of a fan cowl of the gas turbine engine shown in FIG. 1 and configured for forward thrust mode.
Figure 4:
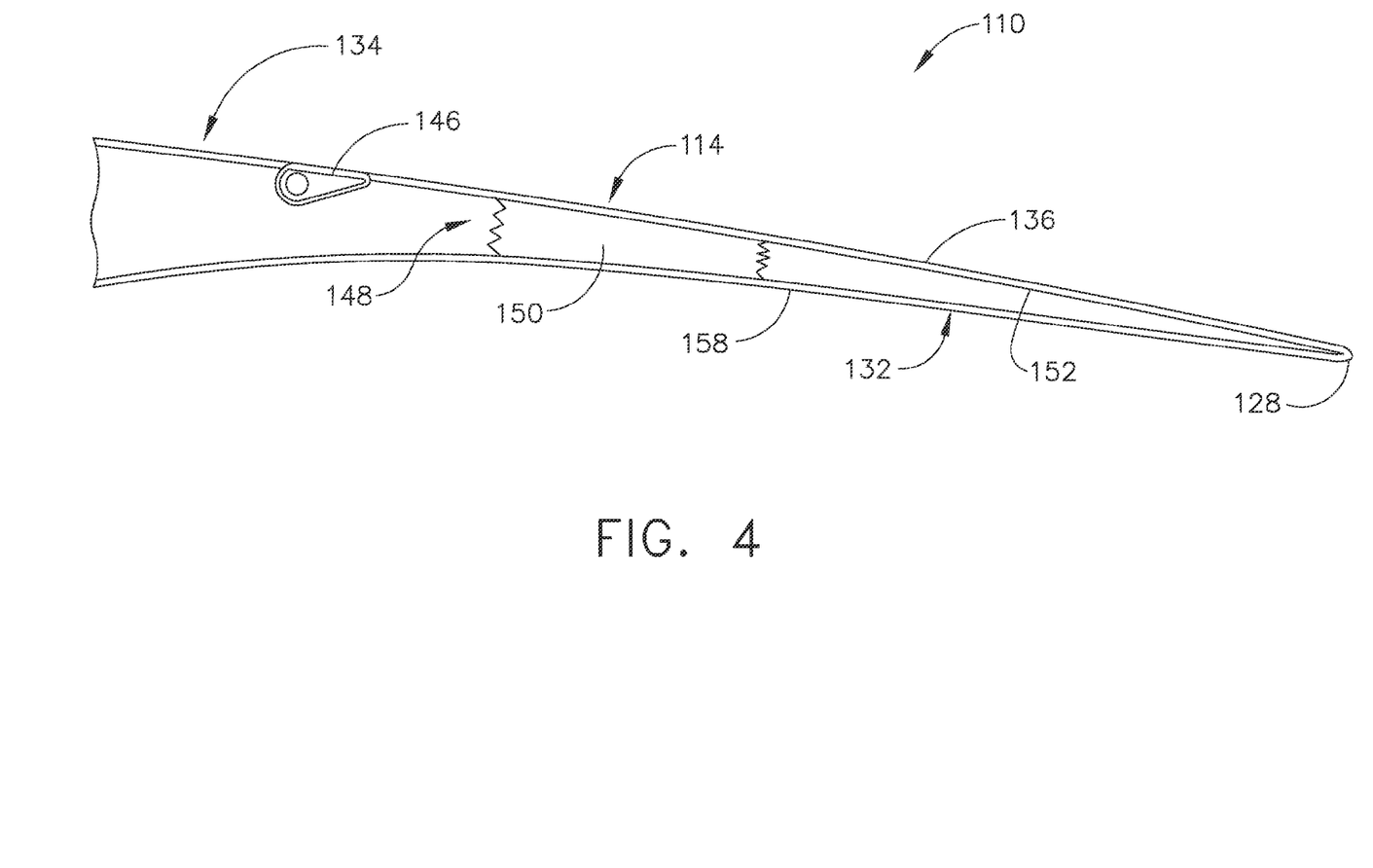
FIG. 4 is a cross-sectional view of an aft segment of the fan cowl configuration shown in FIG. 3.
Figure 5:
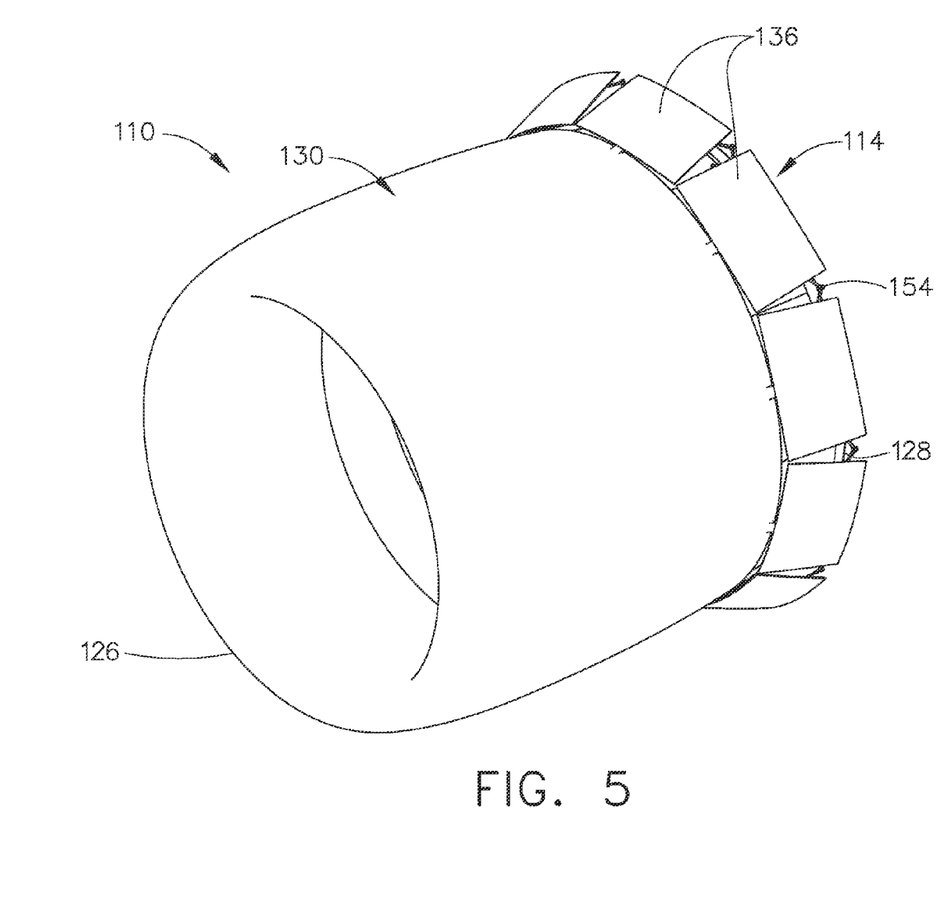
FIG. 5 is a perspective view of the fan cowl shown in FIG. 3 and configured for reverse thrust mode as shown in FIG. 2.
Figure 6:
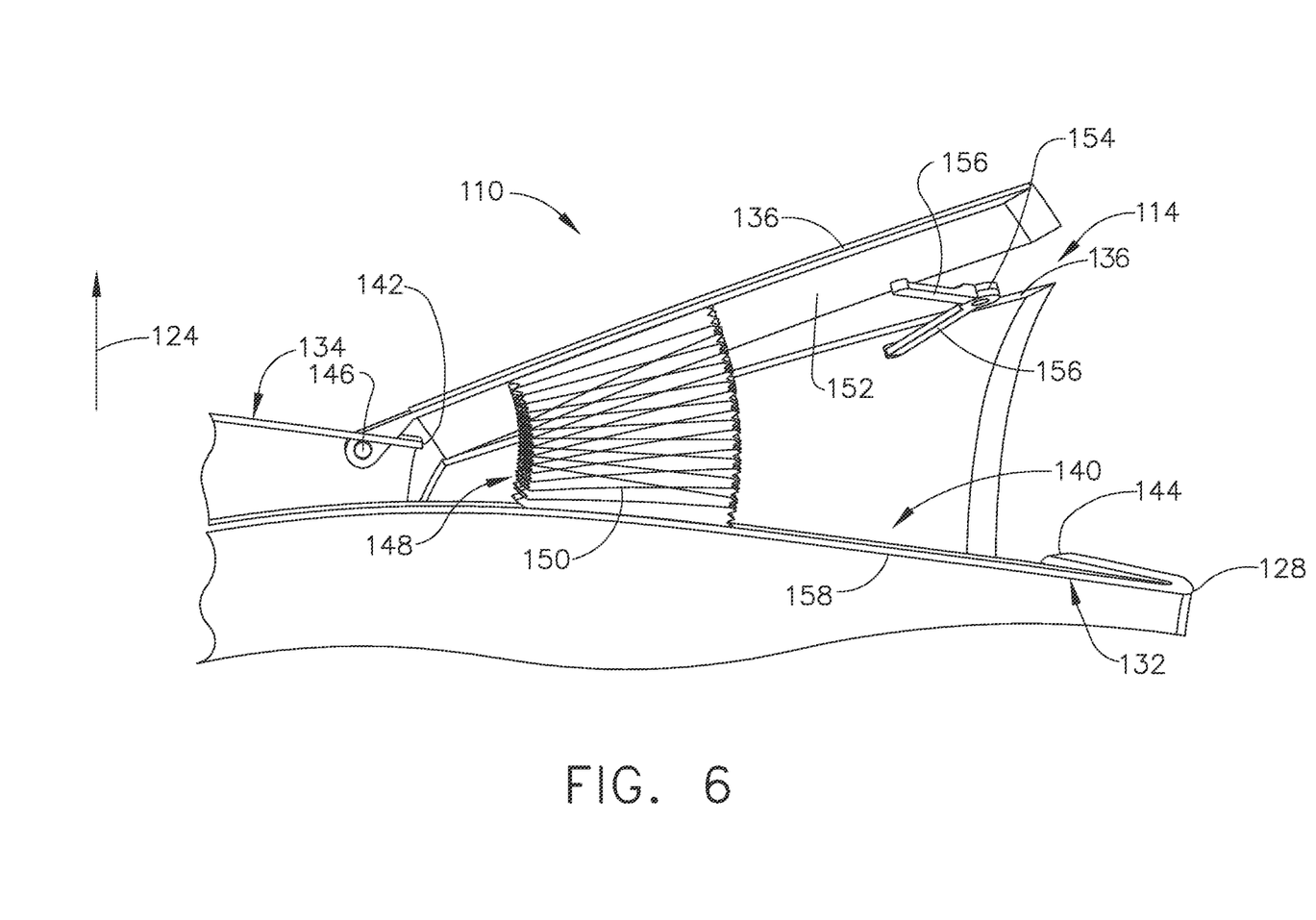
FIG. 6 is a cross-sectional view of an aft segment of the fan cowl configuration shown in FIG. 5.

FIGS. 3 and 4 illustrate fan cowl 110 configured for the forward thrust mode of engine 100 as shown in FIG. 1. FIGS. 5 and 6 illustrate fan cowl 110 configured for the reverse thrust mode of engine 100 as shown in FIG. 2. In the exemplary embodiment, fan cowl 110 includes an annular forward edge 126, an annular aft edge 128, and an annular body 130 extending from forward edge 126 to aft edge 128. Notably, the annulus of body 130 may in some instances be interrupted by a pylon or other suitable structure for mounting engine 100 on the wing of an aircraft, thereby rendering body 130 less than annular in some embodiments.

Body 130 has an inner wall 132 and an outer wall 134, and spoiler 114 is mounted to outer wall 134, inner wall 132, and/or a suitable mounting structure disposed between outer wall 134 and inner wall 132. In the exemplary embodiment, spoiler 114 includes a plurality of spoiler panels 136 disposed side-by-side in an annular arrangement when stowed such that adjacent spoiler panels 136 nearly abut one another at their sides 138. The annular arrangement of spoiler panels 136 is received in an annular recess 140 of outer wall 134 such that spoiler panels 136 nearly abut outer wall 134 at a forward end 142 of recess 140 and at an aft end 144 of recess 140 to provide a substantially smooth aerodynamic contour transition for ambient air flowing over outer wall 134 and spoiler panels 136 when spoiler panels 136 are stowed (i.e., when stowed, spoiler panels 136 are substantially flush with outer wall 134 at forward end 142 and aft end 144 of recess 140). In other embodiments, spoiler 114 may have any suitable number of spoiler panels arranged in any suitable manner when stowed to provide any suitable aerodynamic contour in relation to outer wall 134 that facilitates enabling spoiler 114 to improve the quality of airflow through bypass duct 112 as described herein.

Moreover, in terms of deployment, each spoiler panel 136 is mounted on a hinge 146, and spoiler panels 136 are provided with an actuation mechanism 148 for pivoting spoiler panels 136 in radial direction 124 about their associated hinges 146. In the exemplary embodiment, actuation mechanism 148 includes a plurality of bellows devices 150 each being dedicated to one spoiler panel 136. Furthermore, each bellows device 150 is coupled to an underside 152 of its associated spoiler panel 136 so as to be inflatable for deploying its associated spoiler panel 136 and deflatable for stowing its associated spoiler panel 136. Suitably, each bellows device 150 may be operated by its own dedicated pump(s); or the plurality of bellows devices 150 may as a collective unit share one or more pumps, or be configured to utilize bleed air from core 104.

In the exemplary embodiment, bellows devices 150 are operated in unison to synchronize the transition of spoiler panels 136 between their stowed state and their deployed state. More specifically, upon operation of actuation mechanism 148, the annular arrangement of spoiler panels 136 when stowed (FIG. 3) is converted into a substantially splayed arrangement of spoiler panels 136 when deployed (FIG. 5). To facilitate deploying and stowing the spoiler panels 136 in unison, each adjacent pair of spoiler panels 136 is coupled together by a linkage 154 that causes each spoiler panel 136 to pivot in response to its adjacent spoiler panel 136 pivoting, and each linkage 154 is provided with a pair of hinged arms 156 that enable the linkage 154 to foldably expand and contract as spoiler panels 136 transition between the annular arrangement and the splayed arrangement. When stowed, each linkage 154 is hidden underneath its associated spoiler panels 136 and is not exposed to ambient air flowing over its associated spoiler panels 136. When deployed, on the other hand, each linkage 154 spans the spacing between its associated spoiler panels 136 and is, therefore, exposed to ambient air flowing between its associated spoiler panels 136.

Suitably, in other embodiments, spoiler 114 may be configured with any actuation mechanism that facilitates selectively pivoting spoiler panels 136 in radial direction 124 (e.g., the actuation mechanism may include a suitable pneumatically or hydraulically operated linear actuator such as a piston-cylinder-type linear actuator, or alternatively a suitable rotary actuator, dedicated to each spoiler panel 136). Moreover, in lieu of or in conjunction with linkages 154, spoiler 114 may have any suitable device(s) for synchronizing the movement of spoiler panels 136 (e.g., the pneumatic or hydraulic operation of actuation mechanism 148 may inherently synchronize the movement of spoiler panels 136, or another mechanical synchronization device may be employed for assisting or replacing linkages 154 as desired).

Notably, because interior surfaces 158 of fan cowl 110 define the radially outer boundary of bypass duct 112 as shown in FIGS. 1 and 2, the continuity of such interior surfaces 158 can influence the quality of the airflow through bypass duct 112. In particular, discontinuities such as gaps along interior surfaces 158 can result in leakage from, and hence depressurization of, airflow through bypass duct 112. Thus, it is desirable to have interior surfaces 158 be substantially continuous (e.g., substantially free of discontinuities such gaps) to facilitate minimizing pressure losses within bypass duct 112 and to facilitate optimizing the thrust generated by airflow exiting bypass duct 112, in turn facilitating optimization of the fuel efficiency of engine 100.

With this goal in mind, spoiler 114 is configured as a strictly external mechanism of fan cowl 110 in the exemplary embodiment (i.e., no movable components of spoiler 114, including spoiler panels 136, contact airflow within bypass duct 112 during operation of engine 100). Stated another way, spoiler 114 is configured as a strictly external mechanism in the sense that the physical flow area of fan cowl 110 at aft edge 128 (i.e., the physical nozzle exit area) remains the same (i.e., does not change) no matter whether spoiler 114 is stowed or deployed, since spoiler 114 itself plays no part in defining the contour of interior surfaces 158 of fan cowl 110 near aft edge 128. For at least this reason, spoiler 114 provides distinct benefits over a variable fan nozzle (VFN). Moreover, by configuring spoiler 114 in this manner, fan cowl 110 is fabricated such that only inner wall 132 defines interior surfaces 158 of fan cowl 110 near aft edge 128, thereby enabling interior surfaces 158 near aft edge 128 to be defined by a strictly static structure (e.g., inner wall 132 which is not configured with movable components) as opposed to a dynamic structure (e.g., spoiler 114 which is configured with movable components and, hence, tolerance gaps between the movable components). Thus, by virtue of spoiler 114 being a strictly external mechanism in the exemplary embodiment, interior surfaces 158 have less discontinuities such as gaps that would have otherwise been present along interior surfaces 158 had interior surfaces 158 been defined in part by movable components of spoiler 114.

As used herein, "physical flow area" refers to a flow area that is defined in terms of structure (e.g., aft edge 128), while "effective flow area" refers to the portion of the physical flow area that, during operation of engine 100, is actually usable for generating thrust (e.g., in some instances, segments of the physical flow area may become occupied by vortices or other disruptions that act to block thrust-generating airflow through those segments of the physical flow area, essentially rendering those segments of the physical flow area unusable for thrust generation purposes).

Figure 7:
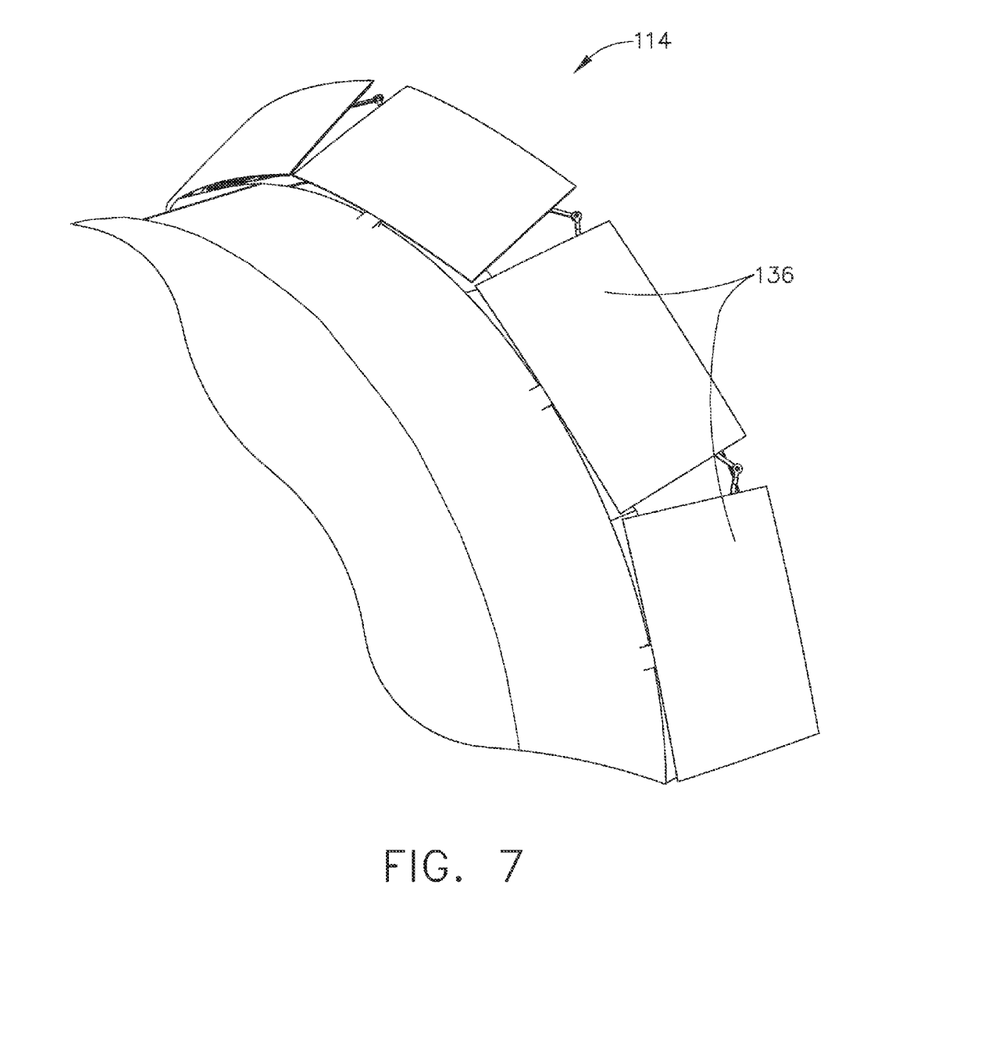
FIG. 7 is a perspective view of another embodiment of a fan cowl for use in the gas turbine engine shown in FIG. 1 and configured for reverse thrust mode.
Figure 8:
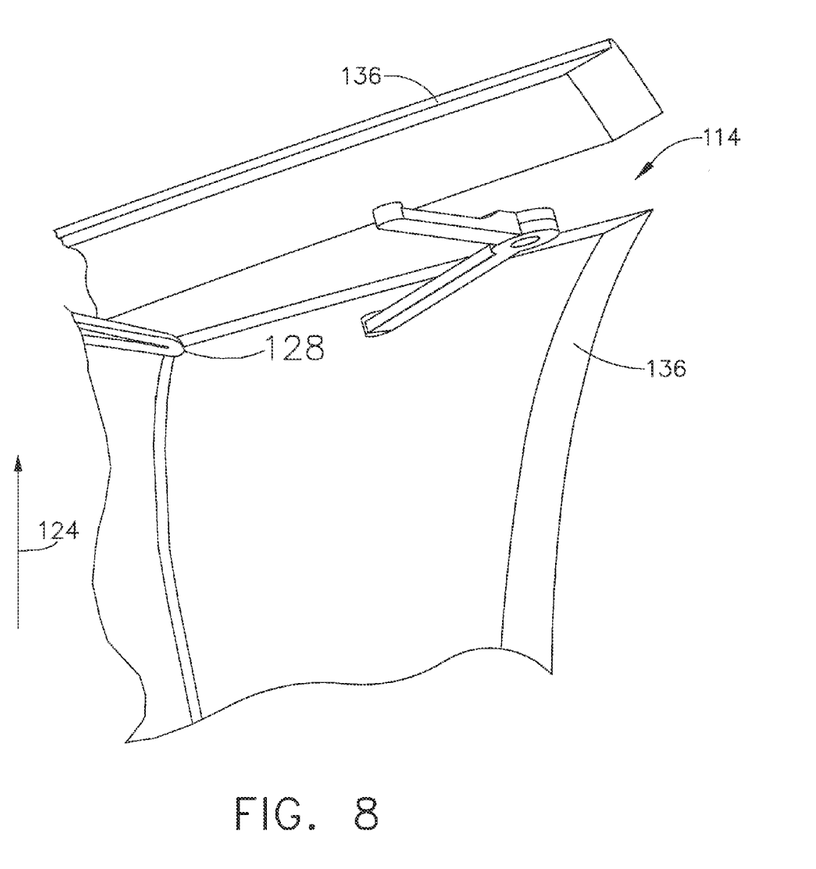
FIG. 8 is a cross-sectional view of an aft segment of the fan cowl configuration shown in FIG. 7.

FIGS. 7 and 8 illustrate another embodiment of spoiler 114. Again, spoiler 114 is strictly an external mechanism, as set forth above. However, in this embodiment, spoiler 114 is configured with an actuation mechanism that translates spoiler panels 136 aft during deployment (i.e., as spoiler panels 136 are pivoted in radial direction 124, they are translated aft). Thus, while spoiler panels 136 do not extend beyond aft edge 128 when stowed, spoiler panels 136 do extend beyond aft edge 128 when deployed. Such an embodiment of spoiler 114 may facilitate enabling ambient airflow to more easily wrap around aft edge 128 in reverse thrust mode of engine 100 and, hence, reduce separation of the airflow from inner wall 132 of bypass duct 112 upon entry into bypass duct 112, increasing the effective flow area of bypass duct 112 while also generating additional drag for engine 100.

Figure 9:
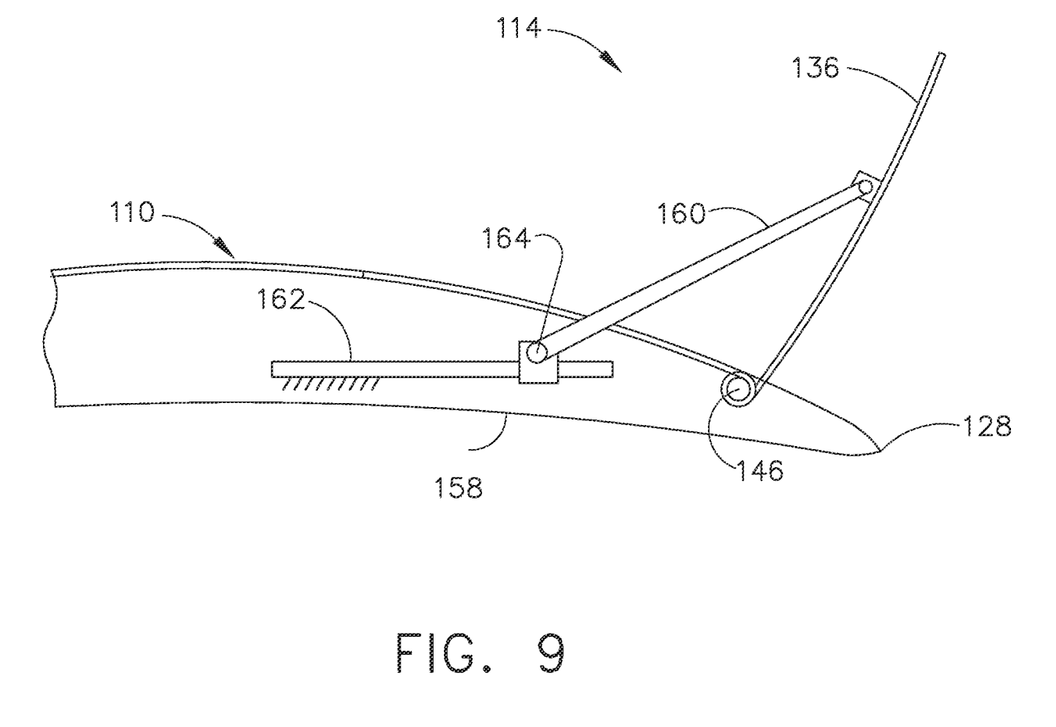
FIG. 9 is a schematic representation of another embodiment of a fan cowl for use in the gas turbine engine shown in FIG. 1 and configured for reverse thrust mode.

FIG. 9 illustrates another embodiment of spoiler 114. In this embodiment, spoiler 114 is strictly an external mechanism like the embodiments set forth above. However, in this embodiment, spoiler panels 136 pivot open in the aft direction (i.e., toward aft edge 128), as opposed to the above embodiments in which spoiler panels 136 pivot open in the forward direction (i.e., toward forward edge 126). As such, this embodiment is configured with hinge 146 disposed further aft than in the embodiments set forth above, as well as with a rod 160 attached to spoiler panel 136 and translatable along a rail 162 via a suitable actuation mechanism so as to be pivotable relative to rail 162 at a pivot joint 164 for pushing spoiler panel 136 open and pulling spoiler panel 136 closed as desired.

Figure 10:
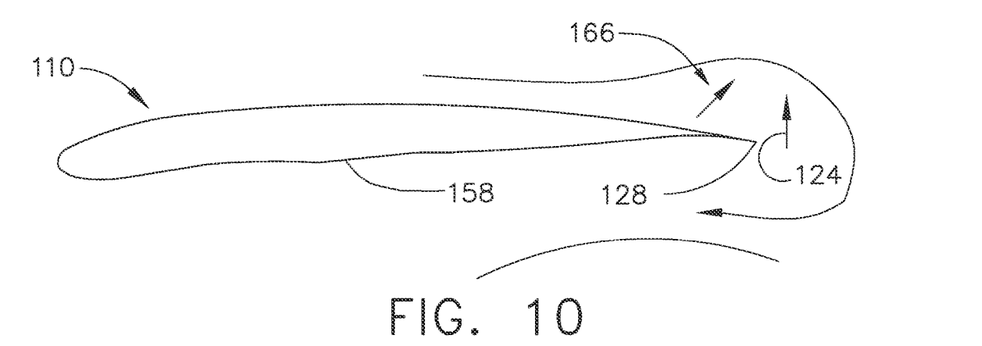
FIG. 10 is a schematic representation of another embodiment of a fan cowl for use in the gas turbine engine shown in FIG. 1 and configured for reverse thrust mode.
Figure 11:
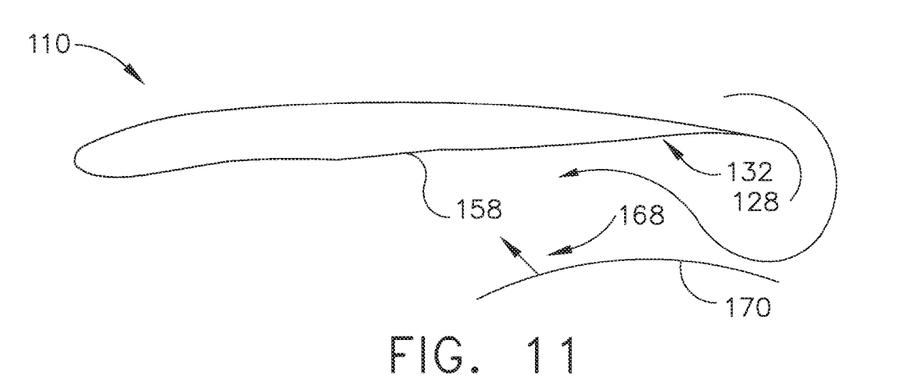
FIG. 11 is a schematic representation of another embodiment of a fan cowl for use in the gas turbine engine shown in FIG. 1 and configured for reverse thrust mode.
Figure 12:
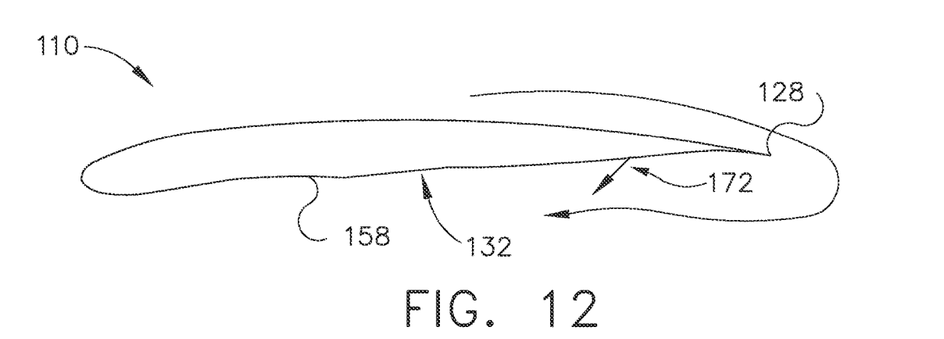
FIG. 12 is a schematic representation of another embodiment of a fan cowl for use in the gas turbine engine shown in FIG. 1 and configured for reverse thrust mode.

FIGS. 10-12 are alternative embodiments of the deflection device of engine 100 in that, instead of including spoiler 114, the deflection device is provided with jets that blow pressurized air to alter the course of ambient airflow entering bypass duct 112 and, hence, improve the quality of airflow provided to fan 102. Particularly, FIG. 10 illustrates an annular arrangement of outboard, fan cowl jets 166 configured to blow pressurized air in radial direction 124 to deflect ambient airflow much like spoilers 114 and, hence, provide the ambient airflow with a larger radius about which to turn when entering bypass duct 112. FIG. 11 illustrates an annular arrangement of outboard, core cowl jets 168 configured to blow pressurized air into bypass duct 112 from a core cowl 170 of core 104 to facilitate deflecting ambient airflow entering bypass duct 112 toward inner wall 132 of fan cowl 110, thereby reducing separation of the airflow from inner wall 132 upon entry into bypass duct 112. FIG. 12 illustrates an annular arrangement of inboard, fan cowl jets 172 configured to blow pressurized air into bypass duct 112 from inner wall 132 to facilitate preventing airflow having already entered bypass duct 112 from turning around and forming vortices along interior surfaces 158 near aft edge 128, since such vortices can function as blockages for airflow entering bypass duct 112. Suitably, in the embodiments of FIGS. 10-12, the jets may be supplied with pressurized air from pneumatic pump(s), or may be supplied with pressurized air from a bleed system of core 104. Notably, the deflection devices set forth herein may also be fabricated from a suitable shape memory alloy as desired.

The above-described embodiments facilitate effectively configuring and operating an airflow deflection device, such as a spoiler, for a gas turbine engine in a manner that facilitates optimizing both the forward thrust and the reverse thrust capabilities of the engine. More specifically, in reverse thrust mode, the above-described embodiments facilitate minimizing recirculation regions (and, therefore, blockages) along the interior surfaces of the engine's fan cowl by increasing the radius about which ambient airflow turns to enter the bypass duct, thereby increasing the amount of air flowing through the bypass duct to the fan. As such, the embodiments facilitate improving the reverse thrust capabilities of the engine by promoting use of the entire physical flow area of the bypass duct for aft-to-forward flowing air in reverse thrust mode (or, in other words, increasing the effective flow area of the bypass duct in reverse thrust mode). Moreover, the embodiments facilitate minimizing pressure distortion in the aft-to-forward airflow through the bypass duct and, thereby, facilitate reducing undesirable vibrations in the fan blades. With respect to forward thrust mode, the above-described embodiments facilitate reducing leakage in the bypass duct of an engine having a variable pitch fan by minimizing the contact between forward-to-aft airflow and the movable components of an ambient airflow deflection device positioned near the aft edge of the fan cowl.

Exemplary embodiments of a gas turbine engine and a method of fabricating the same are described above in detail. The methods and systems are not limited to the specific embodiments described herein, but rather, components of the methods and systems may be utilized independently and separately from other components described herein. For example, the methods and systems described herein for providing an airflow deflection device may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A gas turbine engine having a forward thrust mode and a reverse thrust mode, said gas turbine engine comprising:
   a variable pitch fan configured for generating forward thrust in the forward thrust mode of said engine and reverse thrust in the reverse thrust mode of said engine;
   a fan cowl surrounding said variable pitch fan, wherein said fan cowl forms a bypass duct for airflow generated by said fan, said fan cowl comprising:
     an aft edge that defines a static, physical nozzle exit flow area of said bypass duct in both the forward and reverse thrust modes; and
     a spoiler deployable in a radial direction to deflect airflow near said aft edge, said spoiler configured for operation in the reverse thrust mode of said engine,
   wherein the static, physical nozzle exit flow area of said bypass duct remains the same in the forward thrust mode of said engine and in the reverse thrust mode of said engine, and the entire spoiler is outside of the bypass duct in the forward and reverse thrust modes, and wherein in the reverse thrust mode, the airflow flows around the spoiler and aft edge and enters the bypass duct.

2. A gas turbine engine in accordance with claim 1, wherein said spoiler comprises a plurality of spoiler panels.

3. A gas turbine engine in accordance with claim 2, wherein said spoiler further comprises a linkage for coupling together adjacent ones of said spoiler panels.

4. A gas turbine engine in accordance with claim 2, wherein said spoiler comprises a bellows device associated with each of said spoiler panels for transitioning each of said spoiler panels between a stowed state and a deployed state.

5. A gas turbine engine in accordance with claim 2, wherein said spoiler panels are configured for deployment such that each of said spoiler panels extends beyond said aft edge of said fan cowl.

6. A gas turbine engine in accordance with claim 2, wherein said spoiler panels are deployable in a radial direction.

7. A gas turbine engine in accordance with claim 2, wherein said spoiler panels are deployable such that said spoiler panels pivot open in a forward direction.

8. A gas turbine engine in accordance with claim 2, wherein said spoiler panels are deployable such that said spoiler panels pivot open in an aft direction.

9. A method of assembling a gas turbine engine having a forward thrust mode and a reverse thrust mode, said method comprising:
   providing a core;
   providing a variable pitch fan in flow communication with the core, wherein the fan is configured for generating forward thrust in the forward thrust mode of the engine and reverse thrust in the reverse thrust mode of the engine;
   surrounding the core with a core cowl;
   surrounding the fan with a fan cowl, wherein the fan cowl has an aft edge that defines a static, physical nozzle exit flow area of a bypass duct formed by the fan cowl in both the forward and reverse thrust modes; and
   coupling a spoiler to the fan cowl, wherein the spoiler is deployable in a radial direction to deflect airflow near the aft edge in the reverse thrust mode of the engine such that the static, physical nozzle exit flow area of the bypass duct remains the same in the forward thrust mode of the engine and in the reverse thrust mode of the engine and, in the reverse thrust mode, the airflow flows around the spoiler and the aft edge and enters the bypass duct.

10. A method in accordance with claim 9, wherein the spoiler is coupled to the fan cowl.

11. A method in accordance with claim 9, further comprising providing the spoiler with a plurality of spoiler panels.

12. A method in accordance with claim 11, further comprising coupling adjacent ones of the spoiler panels together by a linkage.

13. A method in accordance with claim 11, further comprising coupling the spoiler panels to the fan cowl such that each of the spoiler panels extends beyond the aft edge of the fan cowl when deployed.

* * * * *